:::
United States Patent [19]

Patton

[11] 4,150,737

[45] Apr. 24, 1979

[54] INCHING VALVE

[75] Inventor: Jon R. Patton, Jackson, Mich.

[73] Assignee: Clark Equipment Company, Buchanan, Mich.

[21] Appl. No.: 821,277

[22] Filed: Aug. 3, 1977

[51] Int. Cl.² .................. B60K 41/24; F16D 67/02
[52] U.S. Cl. .......................... 192/13 R; 137/625.61; 192/109 F
[58] Field of Search ............... 192/4 A, 109 F, 13 R, 192/4 C; 137/625.61, 625.6

[56] References Cited

U.S. PATENT DOCUMENTS

| | | | |
|---|---|---|---|
| 3,143,127 | 9/1964 | Frost | 137/116.3 |
| 3,339,672 | 10/1967 | Crandall | 192/13 R |
| 3,365,035 | 1/1968 | Kress | 192/109 F |
| 3,568,718 | 3/1971 | Wilke et al. | 137/625.6 |
| 3,696,897 | 10/1972 | Kitano et al. | 192/109 F |
| 3,990,549 | 11/1976 | Sisson et al. | 192/4 A |
| 4,006,805 | 2/1977 | Zeller et al. | 192/4 A |

*Primary Examiner*—Samuel Scott
*Assistant Examiner*—James Yates
*Attorney, Agent, or Firm*—Ernst H. Ruf

[57] ABSTRACT

In a control apparatus, for a vehicle having a transmission and brake means wherein hydraulic passage means connects a source of fluid pressure to a fluid actuated clutch, an improved inching valve interposed in said passage means for selectively reducing the hydraulic pressure supplied to the clutch in proportion to the degree of actuation of the brake means in two successive stages wherein there is no direct initial mechanical connection between the inching valve spool and its actuating means whereby in the first stage of operation the solely hydraulical connection between the actuating means and the spool member positively restricts the operation of the improved inching valve to pressures below the maximum desired clutch slip pressure and wherein during the second stage of operation, the clutch pressure is further reduced to a minimum slip pressure.

15 Claims, 4 Drawing Figures

U.S. Patent
Apr. 24, 1979
4,150,737
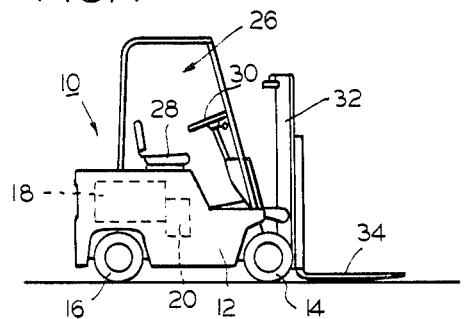
FIG. 1
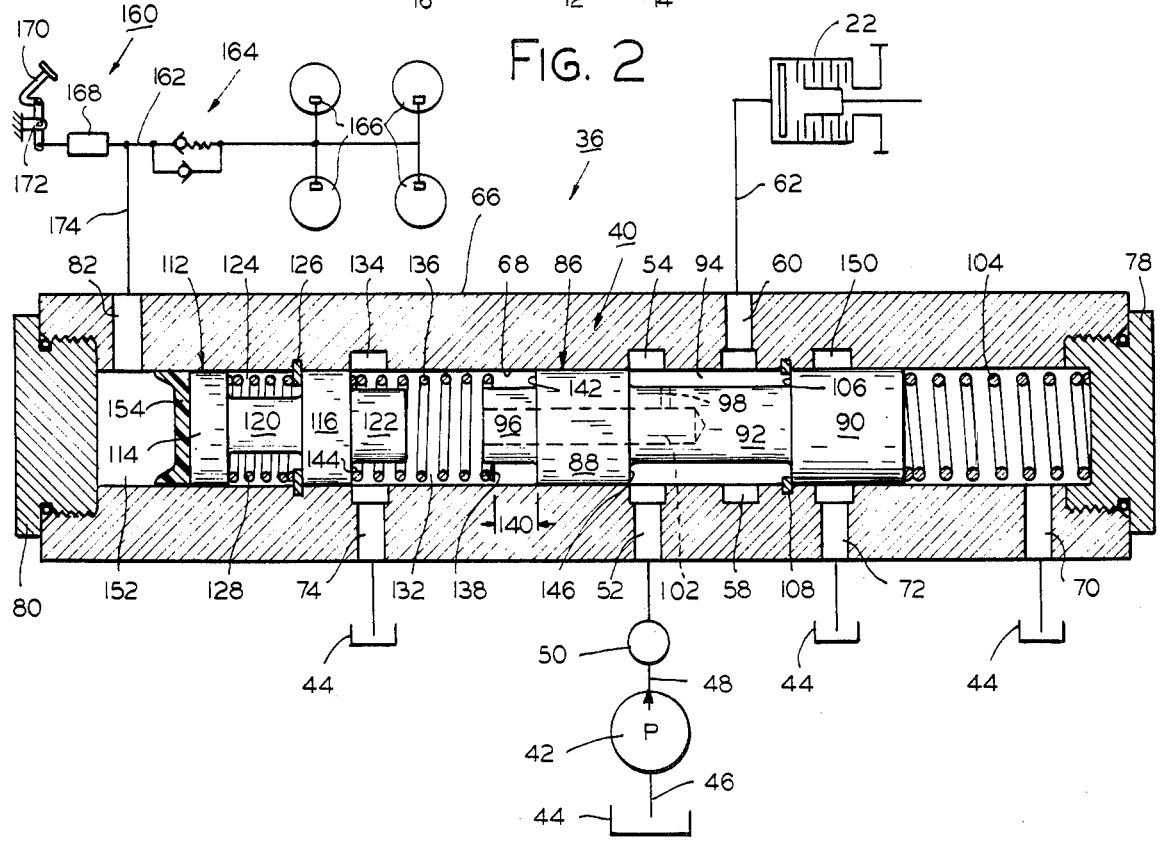
FIG. 2
FIG. 3-PRIOR ART
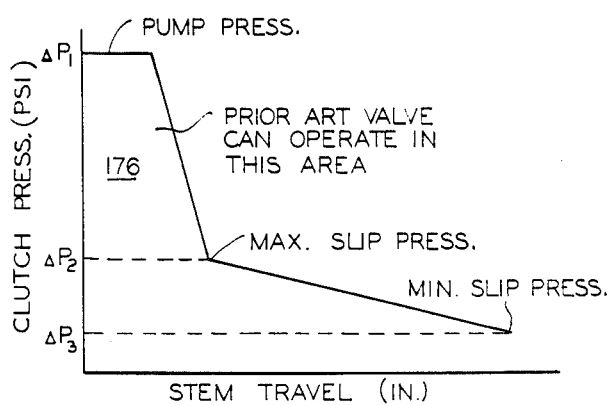
FIG. 4
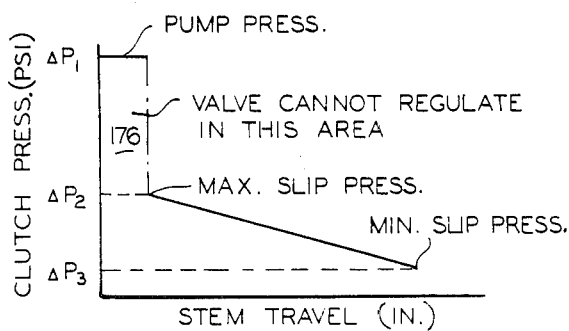

INCHING VALVE

BACKGROUND OF THE INVENTION

1. Field of the Invention

The field of art to which this invention pertains includes pressure regulator or inching valve means for use in fluid operated control systems. More particularly, the improved inching valve of this invention is constructed so that it positively restricts the operation thereof to pressures below the maximum desired clutch slip pressure.

2. Description of the Prior Art

Briefly, this invention constitutes an improvement in pressure regulating or inching valves, with such valves often being used in the prior art for regulating pressure to a fluid operated clutch of the type often found in the constant-mesh powershift transmissions of industrial vehicles, such as lift trucks and the like. Specifically, such prior art control valves are frequently constructed to permit an immediate relief of a portion of the clutch application pressure followed by a regulated decrease or increase in the fluid pressure applied to the fluid clutch whereby the latter may be gradually disengaged or engaged by the operator. One particular use of this type of regulating valve contemplates the control of a fluid-pressure actuated clutch for the transmission of, for example, a lift truck where it is often necessary to hold the truck stationary while the lift fork is operated at a speed corresponding to full engine speed without shifting the transmission to the neutral position. It is desirable, in such circumstances, to be able to precisely move or "inch" the vehicle in either the forward or reverse direction in order to achieve accurate positioning in the handling of materials.

Various controls and regulating valves for performing the above-noted function in conjunction with powershift transmissions applying fluid pressure actuated transmission clutches have been disclosed previously and are exemplified by U.S. Pat. No. 4,143,127 to Frost, as well as U.S. Pat. No. 3,990,549 to Sisson et al, and U.S. Pat. No. 4,006,805 to Zeller et al. In order to carry out their regulating valve function, the valve means, such as described in these patents, have been provided to affect improved gradual engagement or disengagement of the vehicle clutch and the relief of excess pressure in the system by operating the valve means in conjunction with the application and release of the vehicle brakes. In such structures, where the actuation of the valve means may be either hydraulic or mechanical, when the brakes are actuated the valve means shifts to a position partially interrupting fluid flow to the clutch and thereby effects controlled partial deactuation of the clutch by maintaining a relatively low fluid pressure, thus providing control of the torque to the wheels of the vehicle.

In these prior art patents, there is an initial direct mechanical connection between the inching valve spool and its brake-controlled actuating means so that the operator can, by judicious brake pedal actuation, control that portion of the inching valve pressure drop between pump pressure and the desired maximum slip pressure to the detriment of clutch life.

SUMMARY OF THE INVENTION

The improved inching valve of this invention is designed to limit clutch slip at clutch apply pressures below a fixed predetermined value, i.e., below the maximum desired clutch slip pressure. It is desirable to limit clutch slip to pressures below the maximum desired slip pressure since the capacity of a clutch to be cooled is generally limited by fixed parameters such as its size and the volume of available cooling oil flow.

In operation, the prior art pressure regulator or control valves operate satisfactorily until the time when one or more of the truck wheels drops into a hole. At this time, clutch apply pressures higher than normal will be required in order to drive the truck out of the hole, and experienced operators can, by judicial brake pedal play, slip the clutch in the region between the pump pressure and the maximum desired clutch slip pressure which can drastically shorten clutch plate life. Further examples of undesired slippage, induced by operator control, can occur on rough terrain lift trucks that are continually required to operate over holes and humps. The improved inching valve of this invention prevents the operator from slipping the clutch at excessively high pressures, and in fact, positively restricts the operation of the inching valve to pressures below the desired maximum clutch slip pressure.

The improved inching valve of this invention is so constructed that there is no direct mechanical connection between its regulating spool and its actuating means, therefore preventing the operator from manipulating the valve spool at higher than desired slip pressures. In a first stage of operation, the actuating means closes off a normally open drain port thereby causing a build-up of pressure until this pressure exceeds the maximum desired clutch slip pressure. This in turn causes movement of the spool member to completely close off the clutch pressure inlet port, with the spool member and its associated bias means thereafter controlling the pressure to the clutch so as to permit inching of the vehicle. A further operator input, via the brake means, induces a second stage of operation wherein the actuating means is additionally displaced until a further bias means physically contacts the spool member and additionally displaces it until a spool member land portion opens an additional drain port and thereby further lowers the fluid pressure relative to the clutch until a minimum slip pressure is achieved.

Thus, the operation of the improved inching valve of this invention is positively restricted to inching pressure values below the maximum desired clutch slip pressure thereby preventing the operator from slipping the clutch at excessively high pressures. This very important pressure restriction significantly enhances clutch life.

Other features and advantages of this improved inching valve will be more readily understood by persons skilled in the art when following the detailed description in conjunction with the several drawings.

BRIEF DESCRIPTION OF THE DRAWINGS

FIG. 1 shows an industrial vehicle, such as a lift truck, in which the present invention finds utility.

FIG. 2 is a schematic diagram, partially in section, which employs the improved inching valve of this invention.

FIG. 3 shows a typical pressure vs. distance relationship for a prior art inching valve.

FIG. 4 shows the pressure vs. distance relationship for the improved inching valve of this invention.

DESCRIPTION OF THE PREFERRED EMBODIMENT

Referring now to the drawings in detail, in FIG. 1 the reference numeral 10 generally denotes an industrial vehicle, such as a lift truck, having a body 12 supported by a pair of drive wheels 14 and a pair of dirigible wheels 16. An engine 18 is disposed in body 12 and is connected to drive wheels 14 through a power shift transmission 20 which utilizes a plurality of fluid pressure actuated clutches, including a forward clutch 22 (FIG. 2). Located on body 12 is an operator station 26 which includes a seat 28, a steering wheel 30 and various hand as well as foot controls. Mounted on the front of lift truck 10 is a telescopic upright 32 which carries a pair of forwardly extending load engaging fork arms 34 adapted to be inserted into a pallet on which a load is placed.

Referring now to FIG. 2, the preferred embodiment of the improved inching valve of this invention will now be described. Numeral 36 generally denotes a typical fluid system or circuit in which the regulator or inching valve, generally denoted by numeral 40, is utilized. Fluid circuit 36 includes a pump 42, driven proportional to engine speed, which draws fluid from a reservoir 44 via a fluid conduit 46. The outlet of pump 42 discharges into a conduit 48 having a pressure regulator 50 interposed therein. Fluid, at a constant pressure, is thereafter supplied to inlet port 52 and groove 54 of inching valve 40, via conduit 48. As will be explained in detail later, pressurized fluid emerges from inching valve 40 via groove 58 and outlet port 60 and flows, via conduit 62, to clutch 22.

Inching valve 40 includes an elongated valve body 66 having a longitudinally extending through bore 68 which communicates, in addition to inlet port 52 and outlet port 60, with spaced drain grooves or ports 70, 72 and 74 all of which are connected via conduits back to reservoir 44. A fixed closure member 78 is provided to sealingly close bore 68 on its right end and another fixed closure member 80 is provided to sealingly close bore 68 at its left end. A further port 82 communicates with bore 68 near the left end portion of bore 68 adjacent to closure member 80.

Slidably disposed in bore 68 is a spool member, generally denominated by numeral 86, which controls the fluid flow between inlet port 52, outlet port 60 and drain port 72.

Spool member 86 has two spaced land portions 88 and 90 that are connected by a central portion 92 having an annular groove portion 94. The outer end of land portion 88 is provided with a locating portion 96. In addition, spool central portion 92 is provided with a radial aperture or orifice 98 which permits communication between annular groove portion 94 and a passageway 102 which extends axially within spool 86 from central portion 92 outwardly through land portion 88 and locating portion 96. A biasing spring 104 is disposed in bore 86 between closure member 78 and spool member land portion 90. During normal operation, spool member 86 is biased to the left by spring 104 until the inner annular end face 106 of land portion 90 abuts stop member 108 received within a groove in bore 68.

Also slidably disposed in bore 68 is an actuating means that preferably takes the form of a piston or stem assembly 112 which includes spaced land portions 114 and 116 that are separated by a central portion 120 having an annular groove portion 124, with land portion 116 being provided with locating portion 122. Projecting radially into groove portion 124 is stop member 126 which is received within a groove in bore 68. Also located in groove portion 124 is spring or bias means 128 which has one end thereof abutting stop member 126 while the other end abuts land portion 114, thereby normally biasing stem assembly 112 to the left until land portion 116 abuts stop member 126.

Located between spool member land portion 88 and stem assembly land portion 116, is a cavity or variable volume chamber 132 that includes a groove 134 in communication with port 74. Contained within cavity 132 as well as supported both on locating portion 122 of stem assembly 112 and on locating portion 96 of spool member 86, is a further spring or bias means 136 whose axial extent is less than the axial extent of cavity 132 when spool member 86 and stem assembly 112 are in their at rest positions, i.e., when they abut stop members 108 and 126 respectively. Therefore, there is a gap, denominated by numeral 140 between end 138 of spring 136 and annular end face 142 of spool land portion 88. The function of gap 140 will be explained in more detail as this description progresses.

It is the function of annular end face 144 of land portion 116 to act as a regulating edge relative to groove 134 so as to control the fluid outflow from cavity 132 via port 74. It is the function of annular end face 146 of spool member land portion 88 to act as a regulating edge with reference to groove 54, thereby controlling the flow of fluid from inlet port 52 to annular groove portion 94. In a similar manner, annular end face 106 of spool member land portion 90 acts as a regulating edge with reference to a groove 150, which is in communication with port 72, to thereby control the flow of fluid from clutch 22 and annular groove portion 94 back to reservoir 44.

Bore 82, near the left end of housing 66, is in communication with a cavity 152 between closure member 80 and land portion 114 of stem assembly 112. Located within cavity 152, and abutting land portion 114, is seal member 154.

As shown in FIG. 2, fluid system 36 is also connected to the vehicle hydraulic brake system 160. Conduit 162, containing brake control valve 164, is connected to the vehicle brakes 166 and to a master cylinder 168 which in turn is connected to a brake pedal 170 pivotable on vehicle body 12 at 172. A branch conduit 174 also connects conduit 162 with port 82 of valve body 66.

It should be understood at this time that the actuation of master cylinder 168 generates pressurized fluid and that a portion thereof is directed into cavity 152 for axially displacing stem assembly 112 to the right so as to subsequently cause annular end face 144 of land portion 116 to eventually completely shut off the flow of fluid from cavity 132. It is only after groove 134 has been completely closed off that an additional input from the vehicle operator will cause further translational movement of stem assembly 112 so as to thereby completely eliminate the gap 140 between spring end portion 138 and inner end face 142 of spool land portion 88. Once there is contact between spring end 138 and annular surface 142, the force on the latter is proportional to the amount of operator input.

While the actuation of inching valve 40 is described with reference to hydraulic actuation via stem assembly 112, it should be understood that valve 40 could also be actuated via a mechanical linkage (not shown) that could interconnect valve 40 and brake system 160. It should be clear that while hydraulic or fluidic actuation of valve 40 is shown, the invention is not limited thereto.

In operation, when vehicle 10 is standing with its engine idling, inching valve 40 is in its inactive or rest position, wherein pressurized fluid is delivered by pump 42, via conduit 48, into regulator valve 40. Upon entering inlet port 52 and groove 54, the fluid flows around spool central portion 92 into annular groove portion 94 from whence it freely exhausts through groove 58 and outlet port 60 into clutch 22 via conduit 62.

Spool member 86 is forced to the left by spring 104 with an effort equivalent to the maximum inching pressure desired, which for one operative example, is 30 pounds per square inch. The force can, of course, be calculated by multiplying the pressure by the projected area of the spool. During normal operation, spool member 86 will be forced to the left by spring 104 until stop member 108 is reached. In this position, an open passage of fluid to clutch 22 is permitted via port 52, groove 54, annular groove portion 94, groove 58 and port 60. At the same time, fluid under pressure will flow through orifice 98 and passageway 102 into cavity 132. However, zero pressure will act on the left hand end of spool member 86, i.e., on locating portion 96 and annular end surface 142 of land portion 88, since the fluid flowing into cavity 132 will be vented out of cavity 132 via groove 134 and port 74. FIG. 2 shows inching valve 40 in its inactive position during which time fluid can freely flow from pump 42 to clutch 22 at full pump pressure.

Now, assuming that lift truck 10 is traveling forwardly in a normal manner, pressurized fluid continues to pass through inching valve 40 in the previously-described manner. Further assuming that the operator desires to inch vehicle 10, he depresses brake pedal 170 with his foot, thereby causing it to pivot at 172, thus exerting fluid pressure on stem assembly 112 and causing it to be axially displaced to the right. Brake control valve 164 delays the application of brakes 166 until the predetermined pressure input by the operator is obtained. The axial displacement to the right of stem assembly 112 is opposed by the bias of spring 128, but once this bias is overcome, land portion annular edge 144 will abruptly close off groove 134 and cut off the fluid flow path from cavity 132 in a first stage of operation. Thereafter, pressure will build up in cavity 132 until this pressure exceeds the force exerted on spool member 86 by spring 104, which, for example, may be on the order of 30 psi, and spool member 86 will move to the right. A spool position will be reached where the flow of pressurized fluid into valve 40 will be fully restricted by the closing of groove 54. Thereafter, the combination of spool member 86 and spring 104 will act as a conventional pressure regulator by controlling the pressure in conduit 62 to a maximum of about 30 psi. Vent groove 150 and port 72 are provided so as to allow excess fluid to flow from clutch 22 and annular groove portion 94 in order to maintain the desired pressure.

Additional input by the operator in a second stage of operation, via brake pedal 170, will cause spring end 138 to abut land annular end face 142 after completely eliminating gap 140 and thereafter push spool member 85 to the right with a force which is proportional to the amount of input. The force of spring 136 will subtract from the force of spring 104 thereby lowering the regulated pressure to a progressively lower value as the input movement, via brake pedal 170, is further increased.

Key elements vital to the function of inching valve 40 include orifice 98, passageway 102, gap 140, spring 136 and vent groove 134.

A perusal of FIG. 3 will show that prior art inching valves, such as, for example, those shown in U.S. Pat. Nos. 3,990,549 and 4,006,805, can and will operate in area 176 between $\Delta P_1$, the maximum pump pressure, and $\Delta P_2$, the maximum slip pressure. The structure of inching valve 40 prohibits the operation of the valve in area 176 as shown in FIG. 4, i.e., the operation of valve 40 is positively restricted to inching pressure values below about 30 psi. This very important pressure restriction prevents the operator from slipping the clutch at excessively high pressures, and, therefore, significantly enhances clutch life.

It will also be appreciated that modifications may be made in fluid circuit 36 and inching valve 40. For example, the actuation of stem assembly 112 may be in any desired manner. Furthermore, orifice diameters, spool diameters and spring rates etc. can be selected to produce various desired performance characteristics.

From the foregoing, it is believed that those familiar with the art will readily recognize and appreciate the novel concepts and features of the present invention. Obviously, while the invention has been described in relation to but a single embodiment, numerous variations, changes and substitutions of equivalents will present themselves to persons skilled in the art and may be made without necessarily departing from the scope and principles of this invention. As a result, the embodiment described herein is subject to various modifications, changes and the like without departing from the scope and spirit of the invention with the scope thereof being determined solely by reference to the claims appended hereto.

What is claimed is:

1. In a control apparatus for a vehicle having a transmission and including brake means comprising hydraulic passage means connecting a source of fluid pressure to a fluid pressure actuated clutch, an improved inching valve interposed in said hydraulic passage means for selectively manually reducing the hydraulic pressure supplied to said clutch in proportion to the degree of actuation of said brake means, said improved inching valve comprising:
   a. an elongated valve body having a through bore with first and second closed ends, said body having an inlet port, an outlet port and multiple drain ports, with all of said ports communicating with said through bore;
   b. a spool member sealingly and slidingly retained within said bore, said spool member including first and second land portions separated by an annular groove portion in constant communication with said outlet port, said spool member further including a passageway through said second land portion and restriction means in constant communication with said passageway and said annular groove portion;
   c. first resilient means between said first closed end and said spool first land portion for biasing said spool member to a first position with an effort equivalent to a maximum desired clutch slip pressure, said through bore also including first stop means for limiting, in one direction, the movement of said spool member to said first position;

d. actuating means sealingly and slidingly retained within said through bore and axially spaced from said spool member;

e. second resilient means within said through bore for biasing said actuating means to a first position, said through bore further including second stop means for limiting, in another direction, the movement of said actuating means to said first position;

f. a variable volume chamber between said spool member second land portion and one end of said actuating means, said variable volume chamber being in full communication with a first drain port when said actuating means is in its first position, said variable volume chamber also being in constant communication with said spool member passageway, said variable volume chamber further containing third resilient means between said spool member and said actuating means, with the axial extent of said third resilient means being less than the axial extent of said variable volume chamber when said spool member and said actuating means are in their first position; and g. said actuating means being operatively connected with said brake means, for initially, in a first stage, overcoming said second resilient means and moving said actuating means to a second position wherein the one end of said actuating means closes off said first drain port thereby causing a build-up of pressure within said variable volume chamber until said pressure exceeds the force of said first resilient means and causes movement of said spool member to a second position wherein said second land portion completely closes off said inlet port, with said spool member and said first resilient means thereafter controlling the pressure to said clutch to permit inching of said vehicle, whereby the solely hydraulical connection between said actuating means and said spool member positively restricts the operation of said improved inching valve to pressures below said maximum desired clutch slip pressure.

2. The control apparatus of claim 1 wherein further input, via said brake means, in a second stage, additionally moves said actuating means until said third resilient means contacts said spool member and thereby further displaces said spool member to a third position wherein said first land portion opens a second drain port and thereby lowers the pressure to said clutch to a minimum slip pressure.

3. The control apparatus of claim 1 wherein said actuating means comprises a stem assembly that includes third and fourth land portions separated by a further annular groove portion.

4. The control apparatus of claim 3 wherein said spool member first and second land portions are adapted to control said inlet port and said second drain port, respectively, and said stem assembly third land portion is adapted to control said first drain port.

5. The control apparatus of claim 3 wherein said second and third land portions are provided with locating portions for centering and locating said third resilient means.

6. The control apparatus of claim 3 wherein an annular inner end surface of said spool second land portion cooperates with said inlet port to regulate the flow of pressure fluid into said first annular groove portion.

7. The control apparatus of claim 3 wherein an annular outer end surface of said stem assembly third land portion cooperates with said first drain port to regulate the flow of pressurized fluid from said variable volume chamber.

8. The control apparatus of claim 3 wherein said second resilient means is located between said stem assembly third and fourth land portions.

9. The control apparatus of claim 1 wherein said restriction means takes the form of a radial orifice.

10. The control apparatus of claim 1 wherein said outlet port is located intermediate said inlet port and said second drain port.

11. A control apparatus for a vehicle having a transmission with fluid actuated clutch means and hydraulic brake means, comprising:

a. a source of fluid pressure including fluid pressurizing means therefor;

b. a fluid conduit connecting said fluid pressure source with said clutch means; and c. an improved inching valve means interposed in said fluid conduit for selectively reducing the hydraulic pressure supplied to said clutch means in proportion to the degree of actuation of said brake means in two successive stages, said improved inching valve means including:

i. an elongated valve body having a through bore with first and second closed ends, said body having an inlet port, an outlet port, as well as first and second drain ports, with all of said ports communicating with said through bore;

ii. a spool member sealingly and slidingly retained within said bore, said spool member including first and second land portions separated by an annular groove portion in constant communication with said outlet port, said spool member further including a passageway through said second land portion and restriction means in constant communication with said passageway and said annular groove portion;

iii. first resilient means between said first closed end and said spool first land portion for biasing said spool member to a first position with an effort equivalent to a maximum desired clutch slip pressure, said through bore also including first stop means for limiting, in one direction, the movement of said spool member to said first position;

iv. actuating means sealingly and slidingly retained within said through bore and axially spaced from spool member;

v. second resilient means within said through bore for biasing said actuating means to a first position, said through bore further including second stop means for limiting, in another direction, the movement of said actuating means to said first position;

vi. a variable volume chamber between said spool member second land portion and one end of said actuating means, said variable volume chamber being in full communication with said first drain port when said actuating means is in its first position, said variable volume chamber also being in constant communication with said spool member passageway, said variable volume chamber further containing third resilient means between said spool member and said actuating means, with the axial extent of said third resilient means being less than the axial extend of said variable volume chamber when said spool member and said actuating means are in their first position; and vii. said actuating means being operatively connected with said brake means, for initially, in a first stage, overcoming said second resilient means and moving said actuating means to a second position wherein the one end of said actuating means closes off said first drain port thereby causing a build-up of pressure within said variable volume chamber until said pressure exceeds the force of said first resilient means and causes movement of said spool member to a second position wherein said second land portion completely closes off said inlet port, with said spool member and said first resilient means thereafter controlling the pressure to said clutch means to permit inching of said vehicle, with further input via said brake means, in a second stage, additionally moving said actuating means until said third resilient means physically contacts said spool member and thereby further displaces said spool member to a third position wherein said first land portion opens said second drain port and thereby lowers the pressure to said clutch means to a minimum slip pressure, whereby the solely hydraulical connection between said actuating means and said spool member, prior to said third position of said spool member, positively restricts the operation of said improved inching valve to pressures below said maximum desired clutch slip pressure.

12. The control apparatus of claim 11 wherein said actuating means takes the form of a stem assembly that includes axially spaced third and fourth land portions, wherein an annular outer end of said third land portion cooperates with said first drain port to regulate the flow of pressurized fluid from said variable volume chamber.

13. The control apparatus of claim 11 wherein said spool member first and second land portions are adapted to control said inlet port and said second drain port, respectively, and said third land portion is adapted to control said first drain port.

14. The control apparatus of claim 11 wherein an annular inner end surface of said spool second land portion cooperates with said inlet port to regulate the flow of pressure fluid into said first annular groove portion.

15. The control apparatus of claim 12 wherein said second and third land portions are provided with locating portions for centering and locating said third resilient means.

* * * * *